N. DAHL.
FREEZING OF FISH AND OTHER ARTICLES OF FOOD.
APPLICATION FILED APR. 27, 1920.
1,367,024.
Patented Feb. 1, 1921.
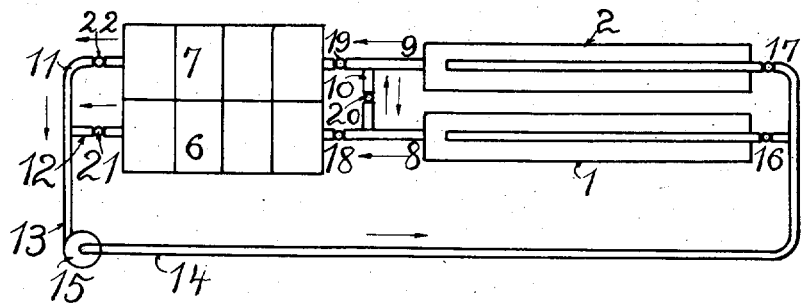
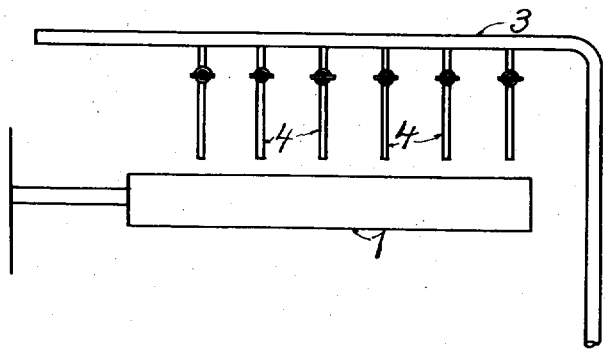
INVENTOR
NEKOLAI DAHL
BY
HIS ATTORNEY

UNITED STATES PATENT OFFICE.

NEKOLAI DAHL, OF TRONDHJEM, NORWAY.

FREEZING OF FISH AND OTHER ARTICLES OF FOOD.

1,367,024.  Specification of Letters Patent.  Patented Feb. 1, 1921.

Application filed April 27, 1920. Serial No. 377,002.

*To all whom it may concern:*

Be it known that I, NEKOLAI DAHL, a subject of the King of Norway, residing at Trondhjem, in the Kingdom of Norway, have invented certain new and useful Improvements in the Freezing of Fish and other Articles of Food; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to the freezing of fish and other articles of food packed in cases or other suitable packing by means of a freezing liquid and has for its object a method of carrying the freezing into effect, whereby large quantities of goods can be thoroughly frozen in short time and by simple means.

When fish and other articles of food packed in cases are frozen by means of freezing liquid supplied at the top of the cases and flowing by its own weight down through the contents of the cases the drawback is met with that the liquid flows along the sides of the cases and not between the individual fishes, as is necessary when a rapid freezing of the whole parcel of goods is to be effected. This is due to the fact that the fishes on account of their pliableness, specific form and adhesiveness form a more or less coalesced mass.

This drawback has been avoided in a freezing method which I have suggested and according to which the freezing liquid is introduced under a certain pressure directly into the interior of the parcel, from which interior place of supply the liquid is forced through the surrounding contents of the case or other packing.

In this latter method the liquid can be supplied to those portions of the contents of the parcel where the individual pieces of goods show the greatest liability to coalesce so that the liquid keeps the single pieces apart by flowing between the same in various directions. By this means even large parcels of goods can be thoroughly frozen in a short time. This method of freezing is in the following designated as the "center freezing" method.

When the "center freezing" is carried into effect it is not possible under ordinary conditions and by the use of ordinary packing cases to place the cases in piles, one above the other, but the cases have to be placed one beside the other. When a large number of cases shall be treated simultaneously, this necessity involves that a large floor area will be occupied and in addition thereto a widely distributed system of pipes for the freezing liquid is required.

According to the present invention these disadvantages are avoided by a suitable combination of the center freezing with the method, in which freezing liquid is caused to flow through the goods by its own gravity.

This invention is based upon the observation that even a very short treatment of the packed fish and the like according to the center freezing method leaves the contents of the case or other packing in a loose condition with interstices between the single pieces of goods which allow freezing liquid to pass easily through the whole body of goods. By a short center freezing treatment the surface of each fish or other piece of goods becomes stiffened so that when the treatment is interrupted, the pieces retain their shape and relative position with the interstices between them and will not coalesce when subsequently treated with a uniform current of freezing liquid supplied from above.

In accordance with this observation the present invention consists in making use of the center freezing as a preparatory step in the freezing, the freezing being completed by a subsequent treatment with freezing liquid flowing through the body of fish by its own gravity.

The preparatory freezing may be effected by freezing liquid of the same temperature, composition and degree of purity as that, by means of which the final freezing is effected, or the two stages of freezing may be effected by liquids of different characters and from different sources.

In the first stage freezing liquid is introduced into the interior of the case or the packing through pipes or hose or the like under a sufficient pressure to cause a current of liquid to flow through the contents of the case. The supply of liquid is continued until the fish or other pieces of goods have attained a certain degree of stiffness, whereupon the freezing is completed by a downward flow of liquid supplied to the top of the cases.

In the first freezing stage the cases may be placed beside one another on a suitable bench and the freezing liquid may be caused to issue at the points where the contents are liable to coalesce. The supply pipes or hose are suitably movable so that liquid can be caused to issue at various places in the interior of the case.

When larger cases are treated, the cases may be placed in one single shift during the second freezing stage, but it is preferred to place the cases in piles. One may then proceed in the manner that when the first stage of freezing has been completed in one case, another case is placed on the top of the first one, whereupon freezing liquid is introduced directly into the interior of this case, until the desired degree of stiffness is attained, whereupon a third case is placed upon the top of the so treated second case and subjected to "center freezing" as described.

These operations are continued so many times as the available space allows of. Usually when herring cases are frozen three and four cases are placed on the top of the others in the described manner. During the whole time freezing liquid from the uppermost will flow down upon the subjacent cases, and on account of the fact that the pieces of goods in these subjacent cases have been subjected to the preparatory center freezing, the contents of the cases is in such a condition as to allow the freezing liquid to penetrate and to rapidly complete the freezing. When the fish cases are placed on top of one another, it is necessary that the bottoms of the cases are provided with openings or perforations, through which the freezing liquid can escape. If the cases are provided with covers during the freezing, the covers should also be provided with openings or holes.

In this manner it is possible to effect the freezing of goods in every kind of cases or packings.

By the described freezing in stages a considerably improved efficiency of the freezing plant is attained. This freezing method is of particular advantage, where a great number of small or middle sized cases are to be frozen, which can easily be placed one on top of the other; but the method is useful also when larger cases are to be treated and when these larger cases are to be placed in one shift or layer only.

When the goods to be frozen have a dirty surface, when they are of inferior quality, or when they will give off a greater quantity of slime, it is of advantage to arrange the supply of freezing liquid in such a manner that pure freezing liquid is supplied as soon as the slime and impurities have been removed therefrom, the outlet for the freezing liquid being so arranged that the impure liquid enters in contact with impure fish only. It will be suitable then to supply freezing liquid from different containers in the different stages of the freezing. When freezing liquid has been supplied in a sufficiently long period of time from one container, the treatment with this liquid is interrupted, and in a second stage of the freezing the goods are treated with freezing liquid from a second or third container. Usually the freezing liquid from the next container should have a different temperature from that of the previous treatment. One may for instance at the first stage make use of a freezing liquid having a comparatively high temperature, for example —5° C., while using at the second stage a liquid having a temperature of for example from —10 to —15° C.

A plant for carrying the above described freezing method into effect is diagrammatically illustrated in the accompanying drawing, in which Figure 1 is a plan view of the plant. Fig. 2 is a side view of the freezing benches.

In the illustrated example 1 is a bench for the preparatory center freezing treatment. 2 is a bench for the final freezing treatment as above described. 3 is a pipe for the supply of freezing liquid to bench 1. 4 are tubes through which liquid is introduced into the interior of the cases or other packing. 5 is a pipe for the supply of liquid to bench 2. 6 and 7 are tanks, supplied with ice and salt for the production of freezing liquid. 8, 10, 11, 12 and 13 are pipes through which freezing liquid is circulated. 15 is a centrifugal pump. 16, 17, 18, 19, 20, 21 and 22 are valves.

Claims:—

1. In the freezing of fish and other goods in cases or other packing by means of currents of freezing liquid the method which consists in subjecting the packed goods to a preparatory freezing by means of freezing liquid introduced directly into the interior of the packing, and then completing the freezing by means of freezing liquid supplied at the top of the case or packing.

2. Freezing method according to claim 1, in which the temperature of the freezing liquid employed in one stage of the freezing is different from that of the second stage.

3. Freezing method according to claim 1, in which the case or package to be subjected to the preparatory treatment is placed on the top of a case or package which has already been subjected to the preparatory treatment, the freezing liquid from the uppermost case or package flowing down through the contents of the subjacent cases or packages and completing the freezing.

4. Freezing method according to claim 1, in which the preparatory freezing is effected by means of freezing liquid of comparatively high temperature, but below the freezing point of water, while the freezing is completed by a colder liquid.

5. Freezing method according to claim 1, in which the freezing is completed by means of freezing liquid having a temperature from —10 to —15° C.

In testimony that I claim the foregoing as my invention, I have signed my name in presence of two subscribing witnesses.

NEKOLAI DAHL.

Witnesses:
  GEORGE P. SORENSEN,
  FRANCES R. JEWETT.